No. 826,570. PATENTED JULY 24, 1906.
F. L. HARMON.
SEWING MACHINE.
APPLICATION FILED SEPT. 11, 1897.
5 SHEETS—SHEET 1.
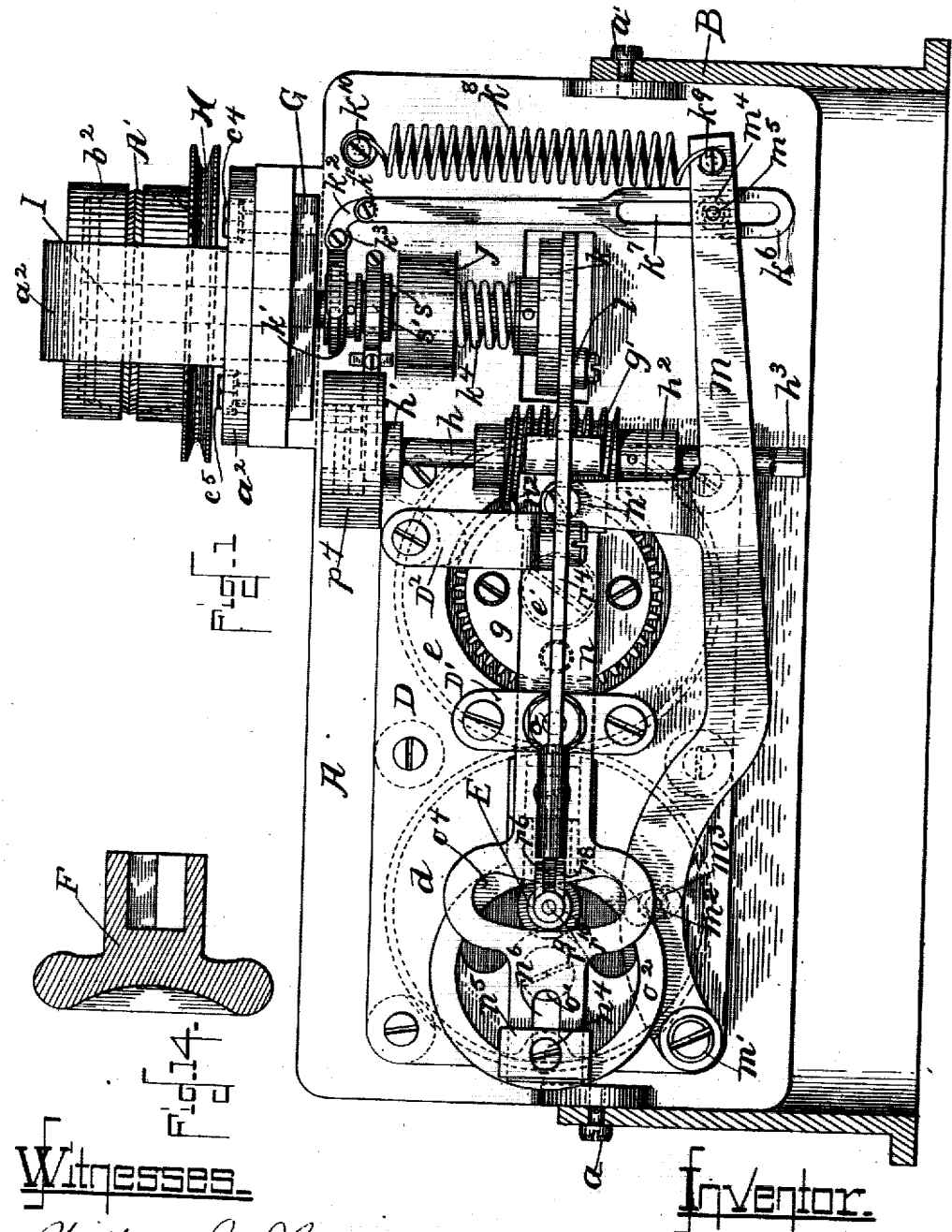
Witnesses
William A. Lee
Charles B. Crocker
Inventor
Frank L. Harmon

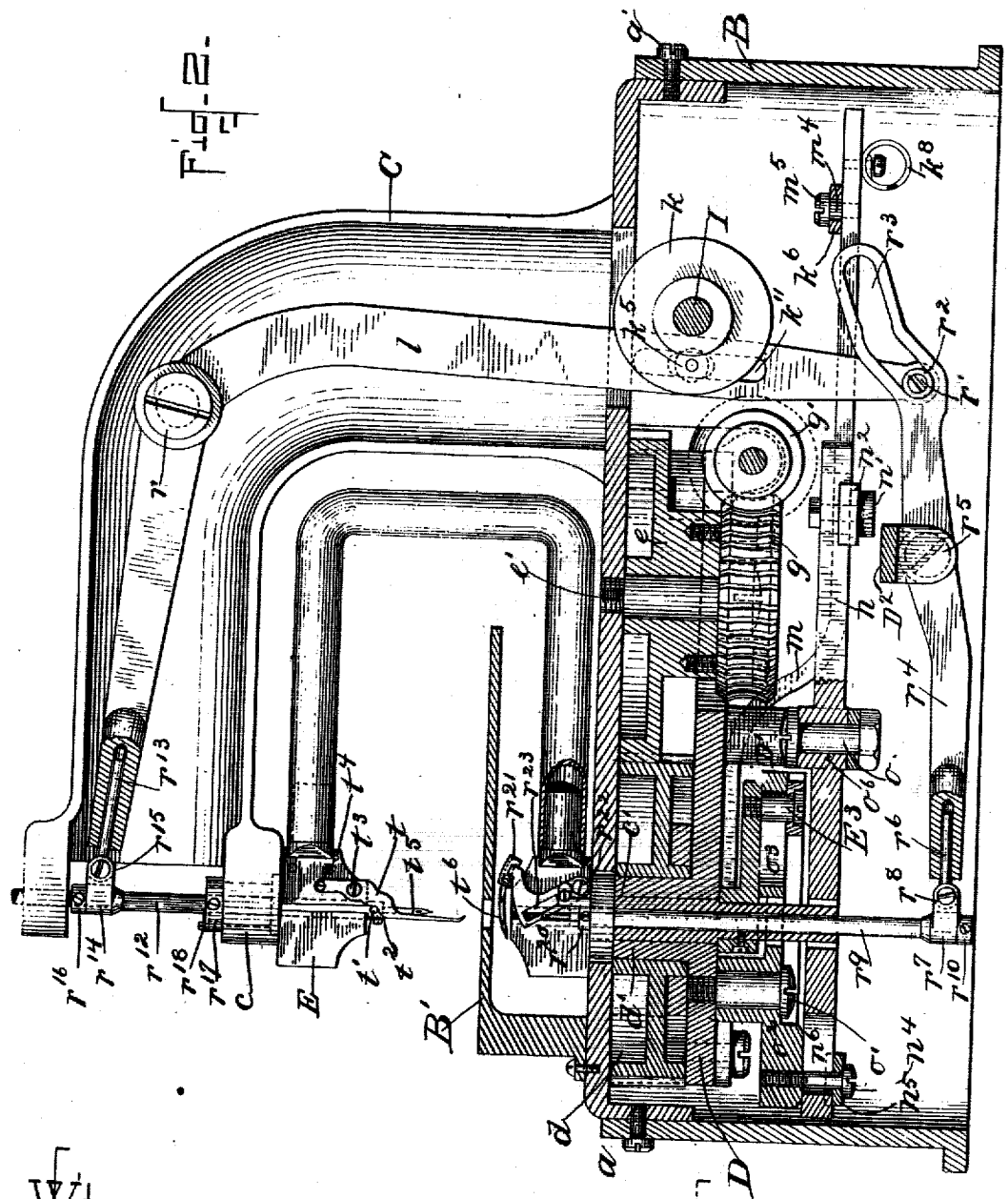

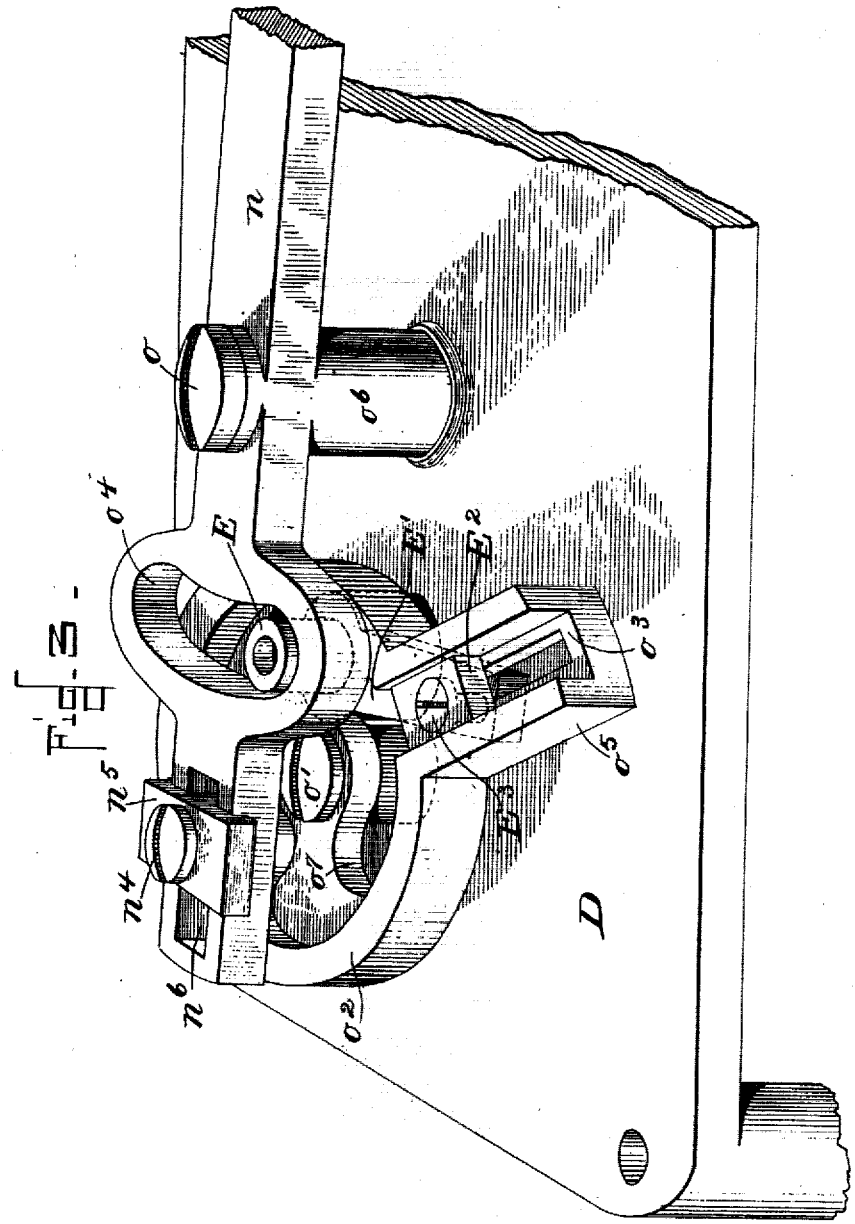

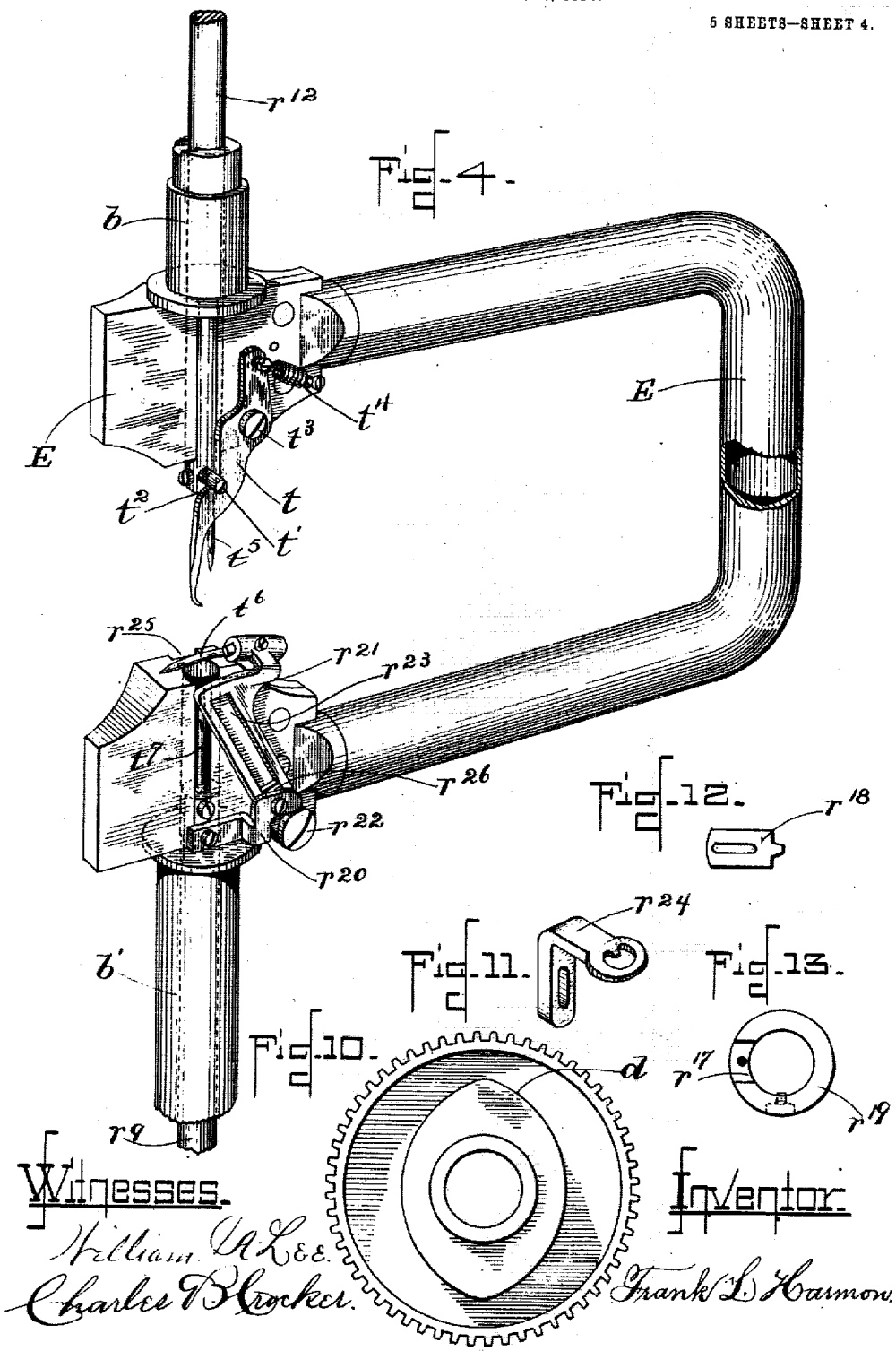

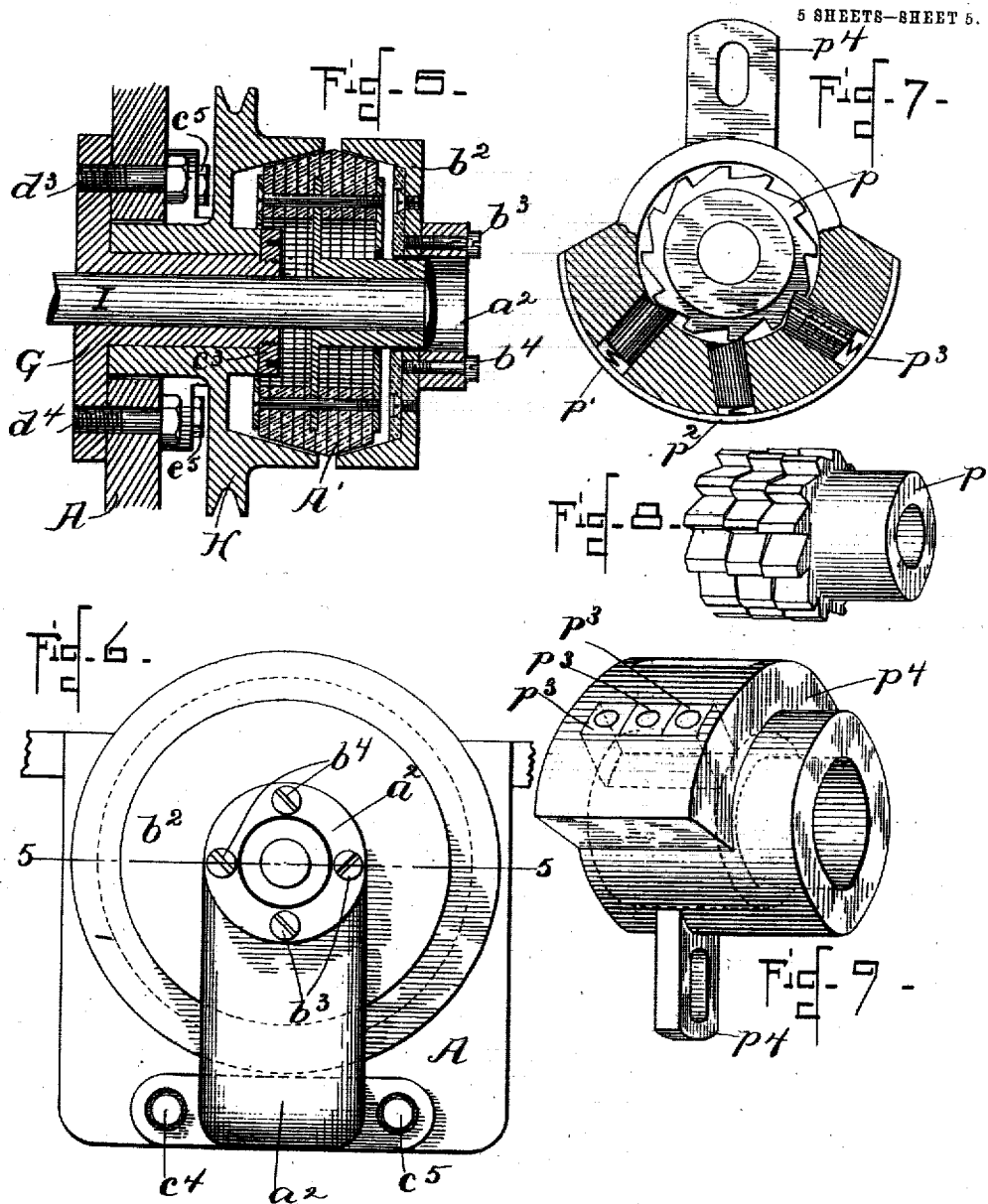

UNITED STATES PATENT OFFICE.

FRANK L. HARMON, OF BEVERLY, MASSACHUSETTS.

SEWING-MACHINE.

No. 826,570.  Specification of Letters Patent.  Patented July 24, 1906.

Application filed September 11, 1897. Serial No. 651,325.

*To all whom it may concern:*

Be it known that I, FRANK L. HARMON, of Beverly, in the county of Essex and Commonwealth of Massachusetts, have invented a new and useful Sewing-Machine, of which the following is a specification, reference being had to the accompanying drawings.

This invention resides in a unique mechanism comprising journals, pivoted levers, and connecting devices between said levers, whereupon said journals and devices whereupon stitches are formed are turned; a connecting mechanism between said unique mechanism and a driving-shaft, said mechanism comprising a cam, worm-wheel, and a worm, and a connecting device between said cam and worm-wheel and also a ratchet mechanism; a clutch mechanism comprising a driving-shaft and two clutch members having conical surfaces, one clutch member connected with said shaft and the other clutch member being also a driving-pulley adapted to be rotated continuously—in practice a conical friction-brake—and means for moving said driving-shaft endwise in one direction for carrying the clutch member connected therewith into contact with the clutch member which is adapted to be rotated continuously, and means for moving said driving-shaft endwise in the opposite direction for carrying the clutch member connected therewith out of contact with the clutch member which is adapted to be rotated continuously and into contact with said conical friction-brake, and a mechanism comprising a lever actuated by a device carried in a cam-slot in said lever by the driving-shaft and another lever actuated by a device carried by the first-named lever in a cam-slot in this lever.

Figure 1 shows a bottom plan of said machine, and Fig. 2 shows a longitudinal section of the same. Fig. 3 is a perspective view of a new mechanism for turning two journals for carrying devices for carrying stitch-forming devices a half-revolution while said stitch-forming devices are being vibrated. Fig. 4 represents a yoke comprising journals upon which devices for vibrating stitch-forming devices are mounted. Fig. 5 is a sectional view of a novel friction-clutch mechanism, whereupon power is connected to and disconnected from the operative or sewing mechanism of the machine, said sectional view being made on line 5 5 of Fig. 6. Fig. 6 shows a side elevation of a part of the bed-plate A, shown as broken off from the bed-plate shown in Fig. 1, and also shows an end view of said clutch mechanism shown in Fig. 5 as seen from the right of said figure and as seen from the left of said clutch mechanism shown in Fig. 1. Figs. 7, 8, and 9 are perspective views of a new compound ratchet mechanism comprising ratchets, pawl-carriers, and pawls. Fig. 10 shows a cam and gear made in one disk, whereupon stitch-forming devices are moved or fed in relation to the material to be sewed; and Fig. 11 shows a throat-plate or work-support. Fig. 12 shows a spline-key by which a needle-bar is turned with a journal while the needle-bar is vibrated in the journal, and Fig. 13 shows a collar to which said spline-key is secured. Fig. 14 shows a section of a hand-wheel whereupon the stitch-forming devices are moved into a proper position to begin to sew on the material and whereupon transmitted power is connected to the operative or sewing mechanism of the machine at the same time.

Upon the bed-plate A (shown in Fig. 1) nearly all of the operative parts of the machine are supported. To repair said parts, the bed-plate A with said parts thereon may be turned up on the pivots $a$ and $a'$ into the position in which it is shown in said figure. The arm C (shown in Fig. 2) is shown secured to the bed-plate A, and in Fig. 1 the support D is shown secured to said bed-plate by six screws, five of which are designated by circles of dotted lines around them. These dotted lines represent bosses or legs on the support D, through which the screws extend. In Fig. 2 the journal-bearing $c$ is shown as situated in the end of the arm C, and the journal-bearing $c'$ is situated in the support D. In said journal-bearings the journals $b$ and $b'$ of the yoke E (shown in Fig. 4) are movably mounted. In Fig. 1 it is shown that the support D covers the cam and gear $d$, which is movably secured to the bearing $d'$ on the support D in the manner shown in Fig. 2. A side elevation of a part of the bed-plate A shown as broken off from the bed-plate shown in Fig. 1 is shown in Fig. 6. Said part of the bed-plate A projects out beyond the stand B, as shown in Fig. 1, and extends downward nearly to the bottom of said stand, as shown in Fig. 6. To this part of the bed-plate A the bracket-arm $a^3$ (shown in Figs. 6 and 5) is secured by the screws $c^4$ and $c^5$, as shown in Fig. 6. To said bracket-arm the friction disk or brake $b^2$ is secured by the screws $b^3$ and $b^4$, as shown in Figs. 6 and 5. Said friction disk or brake has a conical friction-surface, as is shown in Fig. 5. It is not absolutely necessary, however, for said friction disk or brake to have a conical friction-surface, for a flat frictional surface can be used. To said part of the bed-plate A (shown in Figs. 1, 6, and 5) the bearing G, upon which the loose pulley H (shown in Fig. 5) is mounted, is secured by the screws $d^3$ and $d^4$, as shown in Fig. 5. Said bearing G is a journal-bearing for the driving-shaft I, as shown in Fig. 5.

The loose driving-pulley H, which is also a friction-clutch member, is rotatably supported upon the bearing G and is held on said bearing by the nut $c^3$. (Shown also in Fig. 5.) Said loose driving-pulley is rotated continuously in practice by a belt, whether the operative mechanism of the machine is in action or not, thereby rotating the conical friction-surface of said driving-pulley, as will be plain by said figure. The driving-shaft I, mounted in the journal-bearing G, is also mounted in the journal-bearing J on the bed-plate A. (Shown in Fig. 1.) Upon the driving-shaft I (shown in Fig. 1) the eccentric $s$ is secured, and the eccentric-strap $s'$ is connected with said eccentric and with the slot in the pawl-carrier (shown in Figs. 7 and 9) by a screw, so that the pawl-carrier $p^4$ is vibrated by said eccentric-strap when the driving-shaft is rotated. Upon the shaft I a fiber friction disk or clutch member A', having two friction-surfaces and shaped like the frustums of two cones with their big ends put together, is also secured, as is shown in Figs. 5 and 1. These devices are parts of a clutch mechanism which is novel because it comprises devices, hereinafter described, whereupon said shaft is moved endwise in practice to carry and force said friction disk or clutch member A' (shown in Figs. 5 and 1) into frictional contact with the conical friction-surface rotated on account of said loose driving-pulley H, which is also a clutch member, (shown in Figs. 6 and 1,) to cause the operative mechanism of the machine to be started into action, and also comprises devices whereupon said driving-shaft I is moved in the opposite direction, thereby forcing said friction disk or clutch member A' out of frictional contact with the conical friction-surface rotated on account of said revolving loose driving-pulley H, and against the conical friction-surface of the friction disk or brake $b^2$ to stop the operative devices of the machine.

To avoid confusion, it has been considered necessary to first describe the construction of some of the devices whereupon the stitch-forming devices are fed or moved in a circular direction before describing them in combination, because it is necessary to understand the construction of said devices separately, so that they may be fully understood when they are described in combination.

In Fig. 3 attention is called to the unique mechanism whereupon the stitch-forming devices are fed or moved in a circular direction in relation to the material.

The yoke E is turned substantially a half-revolution in practice by moving the end of the lever $n$, which is shown as broken, a fractional part of an inch. The mechanical principles whereupon the yoke E may be turned a half-revolution by moving the end of the lever $n$ such a short distance are employed by the devices shown in Fig. 3, described as follows: The wheel or lever $o^2$ is pivoted on the screw $o'$, the crank or lever E' is under the wheel or lever $o^2$ and is rigidly secured to the yoke E, and the screw $E^3$, rigidly secured in said crank or lever, extends from said crank or lever up through the slot shown in the wheel or lever $o^2$. Upon the screw $E^3$ the block $E^2$, which is adapted to be turned easily on the body of said screw, fits in the slot $o^3$ in the wheel or lever $o^2$. The wheel or lever $o^2$ has a screw $n^4$ rigidly secured therein, and upon the body of said screw the block $n^5$ is mounted, so that said block will easily turn on said screw. Said block has a square part which fits into the groove $n^6$ in the lever $n$, and the lever $n$ is pivoted on the screw $o$. The body of this screw passes down through the boss $o^6$ on the lever $n$, and its threaded part is rigidly secured in the plate D. The yoke E is rotatably supported, as above described. The character E is placed upon the yoke E instead of the character $b'$, which is used to designate the lower journal of the yoke E, because I wish to call attention to the whole yoke (shown in Fig. 4) instead of one of its journals. By moving the lever $n$ (shown in Fig. 3) back and forth a short distance upon the pivot $o$, the slots $o^4$ and $o^7$ admitting, the block $n^5$ is carried toward and from the pivot-screw $o$, and the block $E^2$ is carried toward and from the pivot-screw $o'$, and the wheel or lever $o^2$ is turned more degrees than the lever $n$ is turned, and the yoke E and the crank or lever E', secured thereto, are turned one hundred and eighty degrees substantially, which are more degrees than either one of the other levers is turned, and the devices for actuating the stitch-forming devices (shown in Fig. 2) mounted upon said yoke are thereby carried in a circular direction by said yoke.

Fig. 3 is drawn from a model of this mechanism, because the model is free from devices obscuring it. However, this mechanism is shown subbstantially the same in Figs. 1 and 2, the principal difference being that the lever $n$ is pivoted on the screw $o$, which is fast in the bracket D' instead of being fast in the plate D. (Shown in Fig. 3.)

Having described the mechanism shown in

Figs. 3 and 1 whereupon the yoke E (shown in Figs. 3, 2, and 4) is turned, it is obvious that when the lever n (shown in Fig. 3) is mechanically swung upon the pivot o a short distance the yoke E and stitch-forming devices are thereby turned a half-revolution. In Figs. 1 and 2 it is shown that the block $n^2$ is movably connected with the levers m and n by the screw $n'$ passing through said lever m and said block and through a slot in said lever n. The cam and gear D (shown in Fig. 10) are made in one disk. The gear is shown in Fig. 1; but it is impracticable to try to comprehensively show the cam d under the other devices shown in Fig. 1; but Fig. 1 shows that the lever m is pivoted upon the screw $m'$ and that the stud $m^2$, with the roll $m^3$ thereon, is fast to the under side of said lever m, and the roll $m^3$ upon said stud extends down through the oval slot shown in the support D and bears against the face of the cam or oval figure d, (not shown in Fig. 1 for the above-named reason, but plainly shown in Fig. 10,) and it will be plain that movement is imparted to the lever m by the cam or oval figure d (shown in Fig. 10) acting upon the roll $m^3$ upon the stud $m^2$, fast in the lever m, and movement is imparted to the lever n through the block $n^2$, which is shown movably secured to the levers m and n by the screw $n'$, passing through said lever m and said block $n^2$ and through the slot in said lever n.

By observing the position of the devices shown in the mechanism in Fig. 3 and the position of these devices shown in Fig. 1 and the position of the yoke E, (shown in Fig. 2,) which is ninety degrees from the position in which it is in practice when the sewing of a figure is begun, it will be understood that the operative devices of the machine are shown in Figs. 1 and 2 in the position in which they are in practice when the machine is sewing and after the yoke and stitch-forming devices are turned one-quarter of a revolution. This mechanism should be kept in mind until it is again referred to.

Attention is called to the cam and gear d, which are shown in Fig. 10. The face of said cam and gear is represented by the line which incloses the oval figure or cam. To understand that said cam causes the lever m (shown in Fig. 1) to be moved back and forth at every half-revolution of said cam, it is necessary to reason as follows:

If a perpendicular line be drawn through the center of said cam, the part of the cam on one side of the perpendicular line will be the same as the part of the cam on the other side of the perpendicular line. The machine ceases to sew when the cam-roll $m^3$ (shown in Fig. 1) is against that part of the cam d (shown in Fig. 10) that is farthest from the center of the cam. It again stops when the opposite part of the cam is against the cam-roll or, in other words, after the cam is turned a half-revolution. During the time that the cam is moving a half-revolution the stitch-forming devices are turned on account of said cam a half-revolution and back again to the starting-point, stitching a circular figure on the material and stitching back over the figure or, in other words, stitching over the figure twice.

When the machine is ready to begin to stitch a figure upon a material, the yoke E (shown in Fig. 2) is held ninety degrees from the position in which it is shown in the drawings, and the roll $m^4$ on the stud $m^5$ in the lever m (shown in Fig. 1) is held against the end of the slot $k^7$ in the bar $k^6$ to the right in Fig. 1 against the stress of the spring $k^8$, secured to the stud $k^9$ in the lever m, and the stud $k^{10}$ in the bed-plate A on account of the face of the cam (shown in Fig. 10) being against the roll $m^3$ upon the stud $m^2$, fast to the lever m, (shown in Fig. 1,) thereby holding the bar $k^6$ toward the right in said figure, causing the bell-crank lever $k^2$, pivoted upon its pivot $k^3$ and connected with the bar $k^6$ by the screw $k^{12}$ and also connected with the groove in the collar $k'$, to hold the driving-shaft I toward the left in Fig. 1 against the stress of the spring $k^4$, fast to the bearing J, and around the driving-shaft I and fast to a washer bearing against the disk k, holding the clutch member $A'$ out of contact with the revolving loose pulley H and into contact with the friction disk or brake $b^2$, as is plain by Figs. 5 and 1.

The operation of the feeding devices for moving the stitch-forming devices in a circular direction is as follows: A piece of material upon which a figure is to be sewed is held by hand upon the work-support $B'$, (shown in Fig. 2,) and the hand-wheel, (shown in Fig. 14,) being then on the square end $h^3$ of the shaft h in the journal-bearings $h'$ and $h^2$, (shown in Fig. 1,) is turned by hand-power, which turns the shaft h. Said shaft turns the worm $g'$ fast thereto, said worm turns the worm-wheel g, connected therewith, and said worm-wheel turns the gear e fast thereto, and the gear e turns the cam and gear d, (shown also in Fig. 10,) which meshes into said gear e, and the part of the cam which is farthest from the center of the cam is moved away from the roll $m^3$ on the stud $m^2$, fast in the lever m, (shown in Fig. 1,) whereupon the spring $k^8$, fast to the stud $k^9$ in the lever m and to the stud $k^{10}$ in the bed-plate A, pulls the lever m toward the left in Fig. 1, thereby moving the roll $m^4$ from the right-hand end of the slot $k^7$ in the bar $k^6$, whereupon the spring $k^4$, fast to the bearing J and around the driving-shaft I and fast to the washer-bearing against the disk k, forces said shaft to the right in Fig. 1, and said shaft forces the friction-disk $A'$ fast thereto out of frictional contact with the friction disk or brake $b^2$ and into frictional contact with the revolving driving-pulley H, whereupon the driving-shaft I, eccentric s, eccentric-strap s', pawl-carrier p⁴, shaft h, worm g', worm-wheel g, gear e, fast thereto, and cam and gear d are moved, and the lever m (shown in Fig. 1) is swung in one direction upon its pivot by the power of the spring k⁸ acting upon the lever m and in the opposite direction by the cam d acting upon the roll m³ outside of the cam d, (shown in Fig. 10,) and as the lever m is connected to the block n² by the screw n' (shown in Fig. 1) and as the block n² is movably connected with the lever n (shown in Fig. 1) by the screw n', which passes through the lever m and the block n² and through a slot in the lever n, the lever n is swung on its pivot o, whereupon the yoke E, comprising its journals b and b' (shown in Fig. 4) and devices for vibrating stitch-forming devices and stitch-forming devices, also are turned, as hereinabove described, thereby causing the stitch-forming devices which are also started in operation to stitch a circular figure, as hereinabove described.

The novel mechanism comprising the lever n is hereinabove described in the description of the devices shown in Fig. 3, and it has been demonstrated that by turning the lever n a short distance the yoke E is turned one-half a revolution. Therefore the action of this turning mechanism is not described here, simply because it would be unnecessary repetition. After the stitch-forming devices have stitched over the figure the second time, as hereinabove described, and are returned to the position in which they were in at the time the machine was started into operation, the cam d, (shown in Fig. 10) acting upon the roll m³ on the stud m², fast in the lever m, (shown in Fig. 1,) forces the roll m⁴, secured to the stud m⁵, fast in the lever m, against the end of the slot k⁷ in the bar k⁶, (shown in Fig. 1,) which forces the bar k⁶ to the right in Fig. 1, which moves the bell-crank lever k², connected with the bar k⁶ by the screw k¹², on its pivot k³, which, acting in the groove of the grooved collar k', fast to the driving-shaft I, moves the driving-shaft bodily endwise, whereupon the friction-disk A', fast to the driving-shaft I, is carried bodily by said driving-shaft out of frictional contact with the revolving driving-pulley H and into frictional contact with the friction disk or brake b², whereupon the machine ceases to operate upon the material while the loose driving-pulley H is rotating, leaving the cam-roll m³ (shown in Fig. 1) against that part of the cam (shown in Fig. 10) that is farthest from the center of the cam, so that the operative devices of the machine may be again started in operation on account of turning the hand-wheel F, as hereinabove described.

It should be understood that when the hand-wheel F is turned by hand-power, as aforesaid, to start the operative devices of the machine into operation the yoke E and the stitch-forming devices are thereby moved by hand-power into a proper position to begin a figure upon the material.

I do not limit my invention to the precise construction of the mechanism shown in Figs. 3 and 1; but I consider that the combination of pivoted levers and connecting devices between said levers, as shown in Fig. 3, combined with devices whereupon journals and devices for vibrating complemental stitch-forming devices above and below a work-support may be turned a half-revolution, is of my invention.

The ratchet mechanism comprises the devices shown in Figs. 7, 8, and 9. I am not the first to devise a compound ratchet mechanism—viz., a ratchet mechanism in which pawls are set so that a pawl may be engaged with a ratchet-tooth by moving the pawl-carrier a shorter distance than the length of a tooth. However, I believe that I am the first to devise a compound ratchet mechanism in the manner shown by Figs. 7, 8, and 9. By examining the ratchet shown in Fig. 8 it will be observed that three ratchets are fastened together in such relative positions to each other that the teeth in each row of teeth are not in line with each other, or so that reckoning from the hub of the ratchet (shown in Fig. 8) the first tooth in a row is a little ahead of the second tooth in the same row. In Fig. 7 it is shown that the pawl p³ is engaged with a ratchet-tooth, and by Fig. 9 it will be observed that three pawls p³ are in direct line with each other. The fact is that there are two other pawls directly under pawl p³ in the groove, as is shown in Fig. 9. It will be observed that a small movement of the pawl-carrier (shown in Fig. 7) engages a pawl directly under pawl p³ with a ratchet-tooth, a second movement of said pawl-carrier engages another pawl directly under pawl p³, a third engages the pawl p², a fourth engages another pawl directly under pawl p², a fifth engages another pawl under the last-named pawl, a sixth engages pawl p', a seventh engages a pawl directly under pawl p', an eighth engages another pawl directly under the last-named pawl, a ninth engages pawl p³ a second time, and so on. I believe that ratchets fastened together as shown in Fig. 8 or so that the teeth in the rows of teeth are out of line with each other, combined with a pawl-carrier and pawls connected therewith, as shown in Fig. 9, and arranged as is shown in Fig. 7 in order that they may engage the teeth as aforesaid—viz., all the pawls in the first row engaging the teeth consecutively, then all the pawls in the second row engaging the teeth consecutively, then all the pawls in the third row engaging the teeth consecutively, and then beginning with the first row—forms a novel ratchet mechanism of my invention. By this construction ratchet-teeth may be made strong, while the lost motion of the pawl-carrier is reduced to a minimum. It will be understood that friction-clutch members having conical surfaces combined with a friction disk or brake is an old combination; but I believe that said old combination combined with the driving-shaft I adapted to be moved endwise and means whereupon it is moved endwise, thereby forcing the conical surface of the friction-clutch member A' into frictional contact with the conical friction-surface, which is rotated on account of the driving-pulley H, and out of frictional contact with said friction-surface and into frictional contact with said conical surface of said friction disk or brake forms a novel construction which is of my invention.

Having hereinabove described that part of the sewing mechanism by which the stitch-forming devices are fed or moved in a circular direction in relation to the material and having described the new compound ratchet mechanism employed and having spoken of the novel devices of said clutch mechanism, attention is now called to that part of the sewing mechanism by which the stitch-forming devices are vibrated to form stitches.

Fig. 2 shows that when the disk $k$ is rotated by the driving-shaft I that the roll $k^5$, movably secured to the wrist-pin fast in said disk $k$, is carried in the cam-slot $k^{11}$ in the lever $l$ and that the lever $l$ is rocked upon its pivot-screw $r$, and that the upper end of said lever $l$ is vibrated up and down.

With the needle-bar $r^{12}$ (shown in Fig. 2) the sleeve $r^{14}$ is rotatably connected. Said sleeve is prevented from being raised upon said needle-bar by the collar $r^{16}$, secured to said needle-bar. Pivotally connected with said sleeve $r^{14}$ is the stem $r^{13}$ by the screw $r^{15}$. Said stem $r^{13}$ is inserted into a hole in said lever $l$, as is shown in Fig. 2. Therefore it will be plain that when the upper end of the lever $l$ is vibrated the stem carried by the lever $l$ vibrates the sleeve $r^{14}$, which moves the needle-bar $r^{12}$ up and down in the journal of the yoke E. It will be observed that said needle-bar is free to turn in the sleeve $r^{14}$ while said needle-bar is being vibrated, so that the needle-bar may be turned with the yoke E while it is being vibrated. The device connecting the needle-bar and lever $l$ in itself is old; but it forms a part of novel combinations when combined with these devices. The spline-key $r^{18}$ (shown in position in Fig. 2 and also shown in Fig. 12) fits in the groove in the upper needle-bar, (shown in Fig. 4,) which prevents said needle-bar $r^{12}$ from being rotated without rotating the yoke E, but allows said needle-bar to be vibrated in the journal $b$ of the yoke E. When the upper end of the lever $l$ is being vibrated, in practice to vibrate the needle-bar $r^{12}$ said needle-bar is rotated by said yoke, and the lower end of said lever $l$ is moved to and fro longitudinally of Fig. 2 and the roll $r^2$ on the stud $r'$, fast in said lever, is thereby carried in the cam-slot $r^3$, which cam-slot in the end of the lower lever $r^4$ is shaped substantially like half a rhombus, and said lever is thereby rocked upon its pivot $r^5$ in the bracket $D^2$, (shown in Figs. 1 and 2,) thereby vibrating the other end of the lower lever $r^4$ up and down. I believe that I am the first to provide a lever with a cam-slot therein and to provide means for moving a device in said cam-slot and to combine said devices with journals and complemental rotatory stitch-forming devices above and beneath a work-support, whereupon the stitch hereinafter described is formed with two threads, and this part of my invention is shown, described, and claimed in the above-mentioned application on file, and the claims appended hereto upon this construction are made with respect to the claims in said application.

The stem $r^6$ in a hole in the end of the lower lever $r^4$ is thereby vibrated up and down by said lower lever, and as said stem $r^6$ is pivotally secured to the sleeve $r^7$ by the screw $r^8$ said sleeve $r^7$ is vibrated, and as the needle-bar is rotatably secured in position in said sleeve $r^7$ by the collar $r^{10}$ the needle-bar $r^9$ is vibrated by said sleeve while it is rotatably secured to said sleeve and is turned in said sleeve $r^7$ by the journal $b'$ of the yoke E. It will be observed by Figs. 2 and 4 that said needle-bar is movably mounted in the lower journal $b'$ of said yoke. It will also be plain by Figs. 1, 2, and 3 that said lower journal $b'$, with devices for actuating stitch-forming devices movably secured thereto, is turned when said lower needle-bar is vibrated. Fig. 4 shows that the looper-carrier $r^{12}$ is vibrated on its pivot $r^{22}$ on account of the device $r^{26}$, vibrated in the cam-slot $r^{23}$ in the looper-carrier $r^{12}$ through the bar $r^9$, which is vibrated in the journal $b'$, and that the looper is carried by said looper-carrier, and therefore the claims appended hereto upon this part of my invention are made with respect to the claims upon substantially the same construction shown and described in the above-named application on file. Attention is called to the loop-spreader $t$, shown movably secured to the journal $b$ of the yoke E in Figs. 4 and 2. It will be observed that when the upper needle-bar $r^{12}$ is vibrated as aforesaid the pin $t'$, rigidly secured in said needle-bar, is forced by said needle-bar against the inclined edge $t^2$ of the loop-spreader, which moves said loop-spreader $t$ on its pivot-screw $t^3$, thereby expanding the spring $t^4$, secured to a screw in said loop-spreader and to a screw in the yoke E. Stitches are formed by the stitch-forming devices shown in Figs. 2 and 4 as follows: The under needle $t^7$ is moved upward, and the looper $t^6$ is moved toward the left in Fig. 4, and a loop of the under thread is carried in a vertical line by the under needle $t^7$ up through a material resting upon the throat-plate $r^{24}$, (shown in Fig. 11,) which is then secured in the slot $r^{25}$ in the yoke E, (shown in Fig. 4,) and said loop is carried under the point of the upper needle $t^5$ by the loop-spreader $t$, and a loop of the upper thread is carried down through the loop of the under thread above the material and through the material, and a loop of the under thread is carried through said loop of the upper thread beneath the material and up through the material, and repetitions of these movements form stitches in the material with two threads.

Having thus described this invention and pointed out its principal novel devices, I claim as follows:

1. In a sewing-machine the combination of the following instrumentalities, viz: a yoke comprising two journals one above the other and each rotatably mounted; devices whereupon stitches are formed movably mounted upon said journals and adapted to be turned with said yoke; a crank $E^1$ fast to one of said journals; a pivoted lever $o^2$; a movable connecting device $E'$ between the crank $E^1$ and the lever $o^2$; another pivoted lever $n$; a movable connecting device $n^5$ between the lever $n$ and the lever $o^2$; suitable mechanism comprising suitable means for moving the lever $n$ on its pivot, whereupon said journals and said yoke E are turned, and also comprising suitable means for actuating said devices whereupon stitches are formed.

2. In a sewing-machine the combination of the following instrumentalities, viz: a journal rotatably mounted; another journal rotatably mounted above said journal; devices whereupon stitches are formed movably mounted on said journals; connecting means between said journals whereupon the other journal is turned if one journal is turned; a crank $E^1$ fast to one of said journals; a pivoted lever $o^2$; a movable connecting device $E'$ between the crank $E'$ and the lever $o^2$; a movable connecting device $n^5$ between the lever $n$ and the lever $o^2$; suitable mechanism comprising means for actuating said devices whereupon stitches are formed, and comprising means for moving said lever $n$ on its pivot.

3. In a sewing-machine the combination of the following instrumentalities, viz: a driving-shaft rotatably supported and adapted to be moved endwise and rotated; a loose driving-pulley rotatably mounted; a clutch member connected with said driving-pulley and adapted to be rotated therewith; another clutch member connected with said driving-shaft and adapted to be rotated therewith; means comprising a spring for moving said driving-shaft endwise to engage said clutch members; and means adapted to be manually operated to allow said spring to move said means to move said shaft as aforesaid; suitable mechanism whereupon stitches are formed connected with said driving-shaft.

4. In a sewing-machine the combination of the following instrumentalities, viz: a driving-shaft rotatably supported and adapted to be moved endwise and rotated; a loose driving-pulley rotatably mounted; a clutch member connected with said driving-pulley and adapted to be rotated therewith; another clutch member connected with said driving-shaft and adapted to be rotated therewith; a friction-brake; means for automatically moving said driving-shaft endwise to disengage said clutch members and to engage said friction-brake with one of them; suitable mechanism whereupon stitches are formed connected with said driving-shaft.

5. In a sewing-machine the combination of the following instrumentalities, viz: a driving-shaft rotatably supported and adapted to be moved endwise and rotated; a loose driving-pulley rotatably mounted; a friction-clutch member connected with said driving-pulley and adapted to be rotated therewith; another friction-clutch member connected with said driving-shaft and adapted to be rotated therewith; means comprising a spring to move said driving-shaft endwise to engage said friction-clutch members; and means adapted to be manually operated to allow said spring to move said shaft endwise; suitable mechanism whereupon stitches are formed connected with said driving-shaft.

6. In a sewing-machine the combination of the following instrumentalities, viz: a driving-shaft rotatably supported and adapted to be moved endwise and rotated; a loose driving-pulley rotatably mounted; a friction-clutch member connected with said driving-pulley and adapted to be rotated therewith; another friction-clutch member connected with said driving-shaft and adapted to be rotated therewith; a friction-brake; means for automatically moving said driving-shaft endwise to disengage said friction-clutch members and to engage said friction-brake with one of them; suitable mechanism whereupon stitches are formed connected with said driving-shaft.

7. In a sewing-machine the combination of the following instrumentalities, viz: a driving-shaft rotatably supported and adapted to be moved endwise and rotated; a loose driving-pulley rotatably mounted; a conical friction-clutch member connected with said driving-pulley and adapted to be rotated therewith; another conical friction-clutch member connected with said driving-shaft and adapted to be rotated therewith; means comprising a spring for moving said driving-shaft endwise to engage said conical friction-clutch members; and means adapted to be manually operated to allow said spring to move said shaft endwise to engage said conical friction-clutch members; suitable mechanism whereupon stitches are formed connected with said driving-shaft.

8. In a sewing-machine the combination of the following instrumentalities, viz: a driving-shaft rotatably supported and adapted to be moved endwise and rotated; a loose driving-pulley rotatably mounted; a conical friction-clutch member connected with said driving-pulley and adapted to be rotated therewith; another conical friction-clutch member connected with said driving-shaft and adapted to be rotated therewith; a friction-brake; means for automatically moving said driving-shaft endwise to disengage said conical friction-clutch members and to engage said friction-brake with one of them; suitable mechanism whereupon stitches are formed connected with said driving-shaft.

9. In a sewing-machine the combination of the following instrumentalities, viz: a driving-shaft rotatably supported and adapted to be moved endwise and rotated; a loose driving-pulley rotatably mounted; a conical friction-clutch member connected with said driving-pulley and adapted to be rotated therewith; a clutch member having two conical friction-surfaces connected with said driving-shaft and adapted to be rotated therewith; means comprising a spring for moving said driving-shaft endwise to engage said conical friction-clutch members, and means adapted to be manually operated to allow said spring to move said shaft endwise to engage the conical friction-clutch members; suitable mechanism whereupon stitches are formed connected with said driving-shaft.

10. In a sewing-machine the combination of the following instrumentalities, viz: a driving-shaft rotatably supported and adapted to be moved endwise and rotated; a loose driving-pulley rotatably mounted; a conical friction-clutch member connected with said driving-pulley and adapted to be rotated therewith; another conical friction-clutch member connected with said driving-shaft and adapted to be rotated therewith; a conical friction-brake; means for automatically moving said driving-shaft endwise to disengage said clutch members and to engage said conical friction-brake with one of them; suitable mechanism whereupon stitches are formed connected with said driving-shaft.

11. In a sewing-machine the combination of the following instrumentalities, viz: a loose driving-pulley; a journal upon which said driving-pulley is rotatably secured; a driving-shaft rotatably mounted in said journal and adapted to be moved endwise and rotated; a clutch member connected with said driving-pulley and adapted to be rotated therewith; another clutch member connected with said driving-shaft and adapted to be rotated therewith; means comprising a spring for moving said driving-shaft endwise to engage said clutch members, and means adapted to be manually operated to allow said spring to move said means to move said shaft endwise; suitable mechanism whereupon stitches are formed connected with said driving-shaft.

12. In a sewing-machine the combination of the following instrumentalities, viz: a loose driving-pulley; a journal upon which said driving-pulley is rotatably secured; a driving-shaft rotatably mounted in said journal and adapted to be moved endwise and rotated; a clutch member connected with said driving-pulley and adapted to be rotated therewith; another clutch member connected with said driving-shaft and adapted to be rotated therewith; a friction-brake; means for automatically moving said driving-shaft endwise to disengage said clutch members and to engage said friction-brake with one of them; suitable mechanism whereupon stitches are formed connected with said driving-shaft.

13. In a sewing-machine the combination of the following instrumentalities, viz: a driving-shaft; stitch-forming devices; suitable connecting mechanism between said driving-shaft and said stitch-forming devices whereupon said stitch-forming devices are vibrated to form stitches, and whereupon said stitch-forming devices are turned in relation to the material; and also comprising a ratchet formed by securing three ratchets together so that the teeth are not in alinement, and a pawl-carrier having grooves therein and three pawls in each groove and a spring for moving each pawl.

14. In a sewing-machine the combination of the following instrumentalities, viz: a driving-shaft; suitable stitch-forming devices; suitable connecting mechanism between said driving-shaft and said stitch-forming devices whereupon said stitch-forming devices are vibrated to form stitches, and whereupon said stitch-forming devices are turned in relation to the material; and also comprising a ratchet formed by securing three ratchets together so that the teeth are not in alinement, and a pawl-carrier having grooves therein and three pawls in each groove and a spring for moving each pawl; and also comprising a worm and worm-wheel mechanism.

15. In a sewing-machine the combination of the following instrumentalities, viz: a mechanism comprising stitch-forming devices and comprising a driving-shaft adapted to be moved endwise and rotated; two clutch-members adapted to be automatically engaged by moving said shaft endwise; means for moving said shaft endwise; and connecting means between said shaft and said stitch-forming devices by which said stitch-forming devices are moved in relation to the material, said connecting mechanism comprising a worm and worm-wheel mechanism.

16. In a sewing-machine the combination of the following instrumentalities, viz: a mechanism comprising stitch-forming devices and comprising a driving-shaft adapted to be moved endwise and rotated; two clutch members adapted to be automatically engaged by moving said shaft endwise; means for moving said shaft endwise; and connecting means between said shaft and said stitch-forming devices by which said stitch-forming devices are moved in relation to the material.

FRANK L. HARMON.

Witnesses:
RUFUS H. WOODBURY, Jr.,
FRANCIS S. BECKFORD.